United States Patent
Hilzendegen et al.

(10) Patent No.: US 10,054,241 B2
(45) Date of Patent: Aug. 21, 2018

(54) VALVE, AND THE USE THEREOF FOR A CLUTCH

(71) Applicant: HYDAC FLUIDTECHNIK GMBH, Sulzbach/Saar (DE)

(72) Inventors: Philipp Hilzendegen, Wadern (DE); Peter Bruck, Althornbach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 14/906,294

(22) PCT Filed: Jul. 24, 2014

(86) PCT No.: PCT/EP2014/002026
§ 371 (c)(1),
(2) Date: Jan. 20, 2016

(87) PCT Pub. No.: WO2015/028112
PCT Pub. Date: Mar. 5, 2015

(65) Prior Publication Data
US 2016/0169402 A1 Jun. 16, 2016

(30) Foreign Application Priority Data
Aug. 31, 2013 (DE) ......... 10 2013 014 558

(51) Int. Cl.
*F17D 1/16* (2006.01)
*F16K 31/06* (2006.01)
(Continued)

(52) U.S. Cl.
CPC ......... *F16K 31/0613* (2013.01); *F16D 25/14* (2013.01); *F16K 11/065* (2013.01);
(Continued)

(58) Field of Classification Search
CPC ..... Y10T 137/86759; Y10T 137/86767; Y10T 137/86775; Y10T 137/86493;
(Continued)

(56) References Cited

U.S. PATENT DOCUMENTS

| 4,009,730 A | 3/1977 | Starling |
| 4,316,599 A * | 2/1982 | Bouvet ............... F15B 13/0402 137/625.65 |

(Continued)

FOREIGN PATENT DOCUMENTS

| DE | 101 50 238 | 4/2003 |
| DE | 10 2009 006 445 | 7/2010 |

(Continued)

OTHER PUBLICATIONS

International Search Report (ISR) dated Oct. 8, 2014 in International (PCT) Application No. PCT/EP2014/002026.

*Primary Examiner* — Craig J Price
(74) *Attorney, Agent, or Firm* — Wenderoth, Lind & Ponack L.L.P.

(57) ABSTRACT

A valve has a valve piston (12) guided longitudinally movably in a valve housing (10) and actuated by an operation device (14). In one valve piston position, a connection is produced between a pressure supply port (P) and a working port (A). In another valve piston position, a further fluid-conducting connection is produced between the working port (A) and a tank port (T). The pressure difference arising between the working port (A) and the tank port (T) as flow passes through the further fluid-conducting connection acts, by an actuation device (30), on the valve piston (12). The valve piston passes from a stop position (32), with the further fluid-conducting connection shut off, into a fully open opening position with an enlarged opening cross section from working port (A) to tank port (T).

24 Claims, 3 Drawing Sheets

(51) Int. Cl.
*F16K 39/04* (2006.01)
*F16K 11/07* (2006.01)
*F16K 11/065* (2006.01)
*F16D 48/02* (2006.01)

(52) U.S. Cl.
CPC ...... *F16K 11/0708* (2013.01); *F16K 11/0716* (2013.01); *F16K 39/04* (2013.01); *F16D 2048/0209* (2013.01); *F16D 2048/0221* (2013.01); *Y10T 137/0396* (2015.04)

(58) Field of Classification Search
CPC ..... Y10T 137/86574; Y10T 137/86582; Y10T 137/86622; Y10T 137/86799; Y10T 137/8671; Y10T 137/86702; Y10T 137/86614; Y10T 137/86694; Y10T 137/0396; F16K 39/04; F16K 11/07; F16K 11/0065; F16K 11/0708; F16K 11/0716; F16K 31/0613; F15B 13/044; F16D 25/14; F16D 2048/0209; F16D 2048/0221
USPC ...... 137/625.33–625.35, 625.67, 625, 625.2, 137/625.38, 625.6, 625.64, 625.65, 137/625.68, 625.69, 14; 192/85 R; 477/156
See application file for complete search history.

(56) References Cited

U.S. PATENT DOCUMENTS

| | | | | |
|---|---|---|---|---|
| 5,445,188 A * | 8/1995 | Bourkel | ............. | F15B 13/0402 |
| | | | | 137/625.63 |
| 5,836,335 A * | 11/1998 | Harms | ................ | F15B 13/0402 |
| | | | | 137/14 |
| 6,073,652 A * | 6/2000 | Wilke | ................... | F15B 11/003 |
| | | | | 137/596.16 |
| 6,453,947 B1 * | 9/2002 | Inoue | ................. | F16K 31/0613 |
| | | | | 137/625.65 |
| 6,591,958 B1 * | 7/2003 | Moorman | ............... | F16D 25/14 |
| | | | | 192/85.41 |
| 7,131,410 B2 * | 11/2006 | Kondo | ................. | F01L 1/3442 |
| | | | | 123/90.15 |
| 7,412,989 B2 * | 8/2008 | Segi | .................... | F16K 31/0613 |
| | | | | 137/625.64 |
| 7,841,360 B2 * | 11/2010 | Bruck | .................. | F15B 13/024 |
| | | | | 137/493 |
| 8,006,718 B2 * | 8/2011 | Hamaoka | ................. | F01L 1/34 |
| | | | | 137/315.04 |
| 8,006,719 B2 * | 8/2011 | Nordstrom | ......... | F16K 31/0613 |
| | | | | 137/625.68 |
| 8,225,818 B1 * | 7/2012 | Stephens | ............. | F15B 13/0402 |
| | | | | 137/512.15 |
| 8,387,644 B2 * | 3/2013 | Najmolhoda | ............ | F01L 1/34 |
| | | | | 123/90.17 |
| 8,418,724 B2 * | 4/2013 | Suzuki | ................ | F15B 13/0402 |
| | | | | 137/625.64 |
| 8,656,948 B2 * | 2/2014 | Stephens | ................ | F01L 1/344 |
| | | | | 137/545 |
| 8,662,109 B2 * | 3/2014 | Bill | ...................... | F15B 13/0433 |
| | | | | 137/625.64 |
| 8,991,428 B2 * | 3/2015 | Holmes | ................... | F16K 11/07 |
| | | | | 137/625.65 |
| 2001/0025662 A1 * | 10/2001 | Kawamura | ......... | F16H 61/0251 |
| | | | | 137/625.65 |
| 2004/0208391 A1 | 10/2004 | Kaneda et al. | | |
| 2005/0217740 A1 | 10/2005 | Segi et al. | | |
| 2007/0163662 A1 * | 7/2007 | Reilly | ................ | F15B 13/0402 |
| | | | | 137/625.61 |
| 2008/0083896 A1 * | 4/2008 | Kondoh | ............. | F16K 31/0613 |
| | | | | 251/129.15 |
| 2009/0256092 A1 * | 10/2009 | Nordstrom | ......... | F16K 31/0613 |
| | | | | 251/129.15 |
| 2011/0132717 A1 * | 6/2011 | Sugiura | ................ | F16H 61/143 |
| | | | | 192/85.63 |
| 2012/0326066 A1 | 12/2012 | Tamba | | |
| 2013/0258809 A1 * | 10/2013 | Cotton | .................. | G01V 1/308 |
| | | | | 367/38 |
| 2014/0158220 A1 * | 6/2014 | Schneider | .............. | F16K 11/07 |
| | | | | 137/315.01 |
| 2017/0159832 A1 * | 6/2017 | Hilzendegen | ............. | F16K 3/34 |

FOREIGN PATENT DOCUMENTS

| | | |
|---|---|---|
| EP | 1 455 127 | 9/2004 |
| EP | 1 582 791 | 10/2005 |
| WO | 2011/100800 | 8/2011 |

* cited by examiner

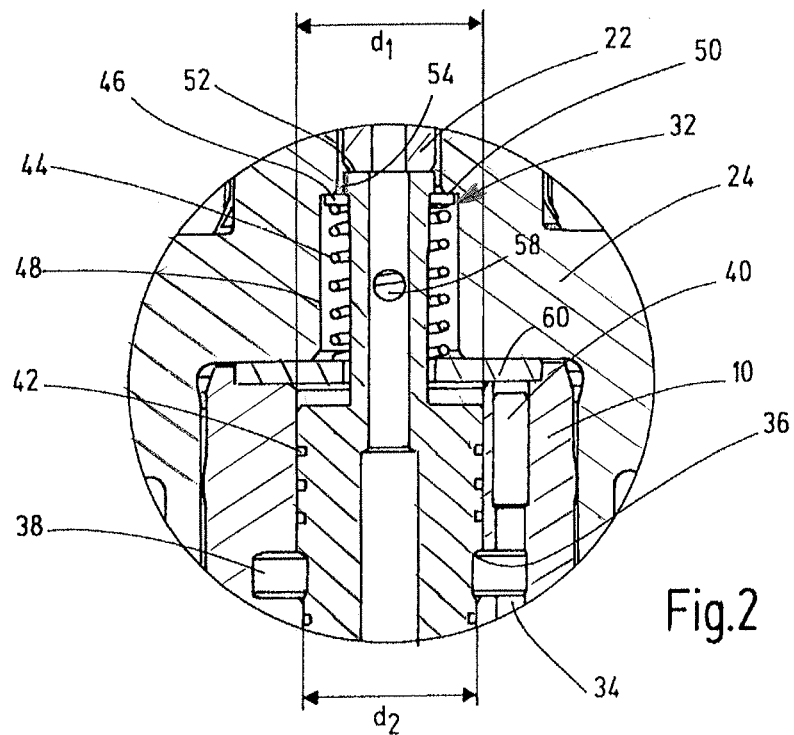
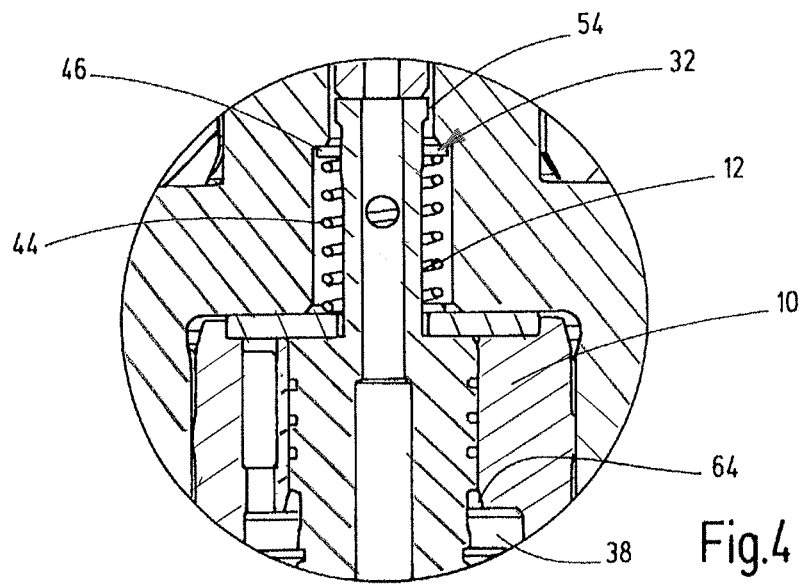

VALVE, AND THE USE THEREOF FOR A CLUTCH

FIELD OF THE INVENTION

The invention relates to a valve, in particular to a proportional pressure regulating valve, having a valve piston guided longitudinally displaceably in a valve housing and controllable by an actuator. The valve housing has several fluid ports. In a movement position of the valve piston, a fluid-carrying connection is establishable between a pressure supply port and a utility port. In another driving position, another fluid-carrying connection between the utility port and a tank port is establishable. The invention further relates to the use of such a valve in clutches.

BACKGROUND OF THE INVENTION

Such valves, in the form of proportional pressure regulating valves, are widely used for mobile working devices for the electro-hydraulic control of clutches.

These clutches must be filled regularly with an operating fluid in the form of oil when activated initially until their friction surfaces reach the point of contact to be able to act as a clutch. To this end, spring forces must be overcome in the clutch. The pressures created by spring forces are often very low (less than 2 bar). A further increase in the clutch pressure then results in normal forces on the clutch linings, which can ultimately transmit the torque through frictional forces.

These low spring forces result in problems when switching off the clutches because, to move the respective clutch disc away from the assignable contact surface, only the pressure caused by these spring forces is available to produce the oil flow through the proportional pressure regulating valves.

There is therefore a requirement for these valves that the pressure loss in the flow from the working port to the tank port should be extremely small because that is the only way to ensure fast and safe switching off of the clutch.

In the current prior art, the largest possible flow cross-section is opened in directly controlled proportional pressure regulating valves through the use of magnets with large working strokes. At the same time, this opening requires as much magnetic force as possible in order not to let the ratio between magnetic force and flow force become too unfavorable. Large and expensive actuator devices in the form of actuating magnets are therefore required.

If one were now to overcome these disadvantages by using smaller, and thus more economical actuating magnets with the same force, which is within the average skill of a person skilled in the art in the field of valve and clutch technology, decreasing the length of the linear force-stroke range would be necessary. If one does not intend to reduce the full opening cross-section for the fast emptying of the fluid medium from the clutch, one must not shorten the actual valve stroke of the valve piston. This situation in turn inevitably results in the spring forces holding the actuating magnet in its non-linear force range when the valve is switched on, requiring a large magnet current for "breaking away the magnet" from the end position.

At the moment, however, where the magnetic force becomes greater than the spring force, one moves on the strongly ascending branch of the characteristic force-stroke line, and the balance between magnetic force and spring force would be lost in favor of the magnetic force. On the PI characteristic line of the valve, this situation would be noticeable from a start-up jump with the result that, upon releasing the clutch, the vehicle starts with a jump, which is particularly unacceptable for safety reasons for mobile working devices.

SUMMARY OF THE INVENTION

An object of the invention is to provide an improved valve, that retains the advantages of the prior art valves that, at least for use in a clutch, the start-up jumps described above are avoided, and that is economical in its implementation and functionally reliable in operation.

This object is basically achieved by a valve having the differential pressure that arises during the flow through the further fluid-carrying connection between the utility port and the tank port acting on the valve piston by a control device. The control device acts against a stop position, from which the further fluid-carrying connection is noticeably inhibited, to arrive at a fully open port position, in which, compared to the stop position, an enlarged opening cross-section from utility port to tank port is achieved. An opportunity is then created to increase the valve piston stroke without having to accept the start-up jump of the PI characteristic line. Thus, the valve of the invention can produce a very large opening cross-section upon release of the clutch, and thus, ensure a rapid separation of the coupling.

The valve according to the invention need not be limited to applications in clutches. Rather, it can be generally used where, for space and/or cost reasons, only small actuator devices in the form of actuating magnets can be used, while simultaneously increasing the free travel path of the valve piston beyond the possible operating range of the actuating magnet to arrive at very large opening cross-sections, which, apart from improved fluid removal, also serve to supply larger fluid amounts to hydraulic systems.

Preferably, the control device carries the respective differential pressure, by a control duct, preferably arranged in the valve housing, to a piston ring surface of the otherwise pressure-equalized valve piston. Starting from the stop position, the valve piston reaches the fully open port position under the influence of this differential pressure. The pressure regulation is carried out with the help of the pressure effect on this piston ring surface, preferably designed as an annular surface. Furthermore, the stop position can be formed by a disc-shaped stop element, which is pressurized by an energy accumulator, preferably by a compression spring. The stop element is supported in its stop position on fixed parts of the valve housing or the actuating magnet.

As set forth above and as is common for other comparable valve constructions, the spring force of the energy accumulator is not passed directly to the valve piston forming the regulating piston. In the valve solution according to the invention, a stop element, preferably formed as a disc, is incorporated, as usual, between the valve piston and the compression spring. The stop element normally moves synchronously with the valve piston, while transferring the spring force to move the valve piston to its initial position when the actuating magnet is not energized. However, the valve piston can continue to move, and thus, enable a larger opening cross-section by reaching its fully open port position opening beyond the stop position under control of the differential pressure. The pertinent further movement takes place without the support of the spring force, only under the influence of the differential pressure, which inevitably arises during the flow through the valve from the utility port to the tank port.

As set forth above, the clutch is thus relieved with fluid connection to the tank port by switching off the actuating magnet. The spring force hereby presses the valve piston into a position which permits the flow from the utility port, i.e. the clutch load, to the tank port, and the disc-shaped stop element abuts the pole core of the actuating magnet. As a result of the differential pressure acting on the annular surface of the valve piston, the piston is now moved in the direction of the actuating magnet, but without the spring force. As soon as the clutch is completely emptied, the differential pressure, and hence the force acting on the valve piston, is eliminated.

The valve piston is now in an indifferent state. When switching on the electric actuating magnet again, a minimum magnetic force is now sufficient to move the piston back to the point of contact with the stop disc. A low actuation force of the magnet in the nonlinear region is thus sufficient to be able to move the piston out of this indifferent region. As soon as the contact point with the return spring has been reached, the electrical magnet or actuating magnet is in its linear region, and the mentioned PI characteristic line can be run through cleanly without a start-up jump, ensuring a smooth engagement. The invention thus provides the use of an inexpensive actuating magnet with a low linear stroke range, yet achieving high magnetic force without limiting the valve stroke, which is so important for the low-loss flow.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure and that are not to scale:

FIG. 2 is an enlarged, partial side view in section of the valve of FIG. 1, showing the valve in a relief position, with a partially opened fluid connection from the utility port A to the tank port T without overtravel;

FIG. 4 is an enlarged partial side view in section of the valve of FIG. 3, corresponding to FIG. 2, but with a control duct, closed by a plug and drawn in on the opposite side.

DETAILED DESCRIPTION OF THE INVENTION

Figure 1:
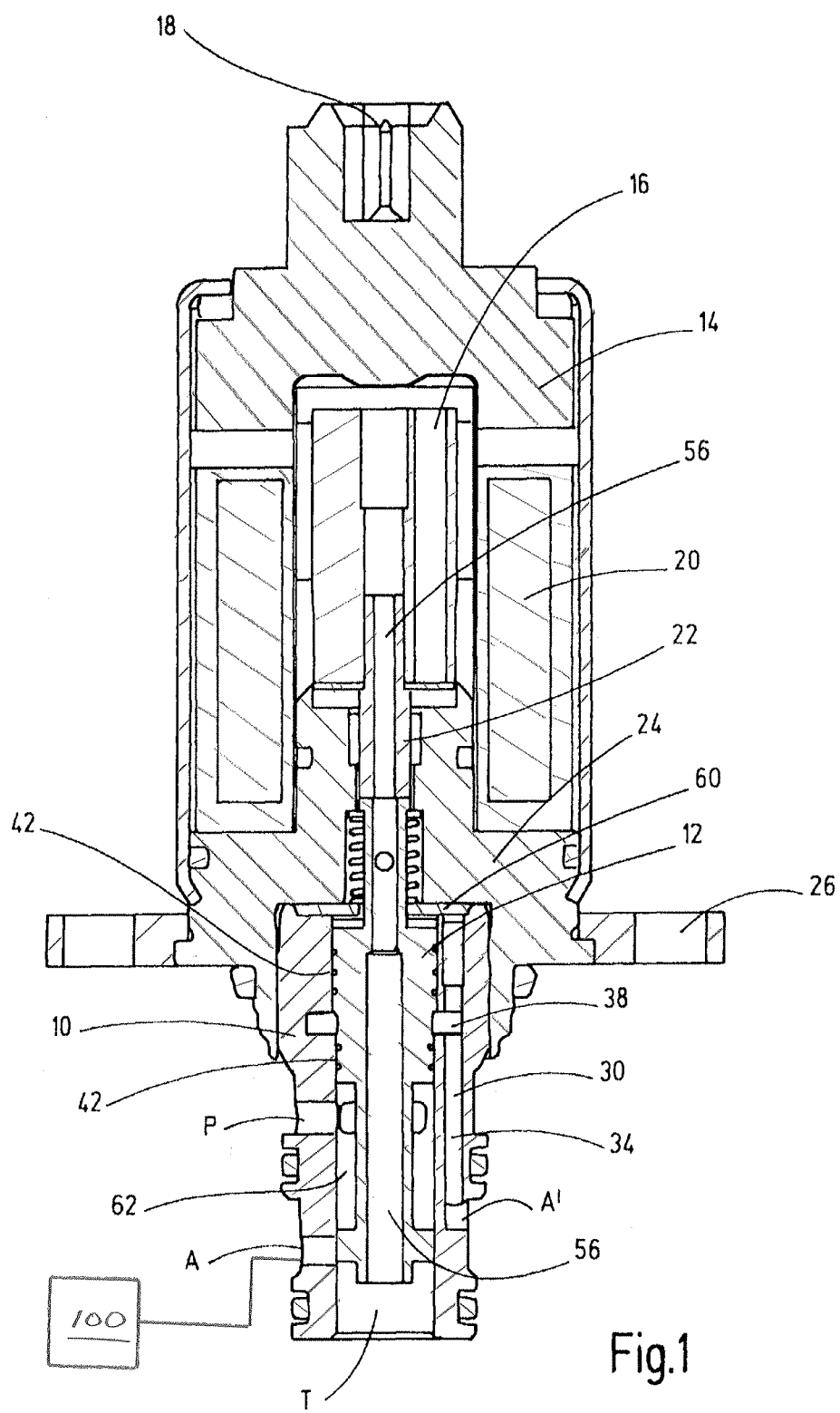
FIG. 1 is a side view in section of complete valve, formed as a proportional pressure regulating valve, according to an exemplary embodiment of the invention.

The valve, shown in the figures, is formed as a proportional pressure regulating valve. The valve includes a valve piston 12, longitudinally displaceably guided in a valve housing 10. The valve or control piston 12 is controllable by an actuator device or actuator 14 in the form of an actuating magnet for assuming its individual movement positions. The actuating magnet 14 is designed according to the prior art and includes a coil winding 20, energizable by a plug 18, for moving a magnet armature 16. The actuating magnet 14 is designed as a push magnet, i.e., when current flows through the coil winding 20, the magnet armature 16 moves downward in the viewing direction on FIG. 1. The one free end of the valve piston 12, exerts a force on the magnet armature 16 via its actuating plunger 22, which abuts with its free front end, thus triggering a movement of the valve piston 12.

The actuating magnet 14 is designed to be pressure-tight. Its pole core 24 opens into a flange plate 26 at its end. By flange plate 26 the complete valve can be affixed to a valve or control block (not shown). In front of the corresponding port on such a complete valve or control block, the valve housing, on its outer circumference, is designed as a plugged part in cartridge design and, on its outer circumference, and is equipped with sealing rings for the connection to the corresponding fluid connection points in the valve or control block.

In particular, for this purpose, the valve housing 10 includes a pressure supply port P and a utility port A in radial directions, and a tank port T at the free front axial end of the valve housing 10, relative to the valve longitudinal axis. Via the pressure supply port P, a hydraulic fluid of a predeterminable amount and a predeterminable pressure, for example provided by a hydraulic pump (not shown), can be supplied, for example, to its other ports A, T. For the particularly preferred mentioned use of the valve in clutches, the utility port A is connected to a pertinent clutch 100 with clutch discs. If a tank port T is concerned here, this tank port can also concern a common return line, which need not necessarily open into a storage tank, but which at least needs to have a lower pressure, for example, of the magnitude of the tank or ambient pressure, which is generally lower than the pressure at the pressure supply port P or at the utility port A.

The design of a valve as described above is known. In contrast, the solution according to the invention distinguishes itself, inter alia, by the respective differential pressure, created when flowing through the fluid-carrying connection between the utility port A and the tank port T, acts on the valve piston 12. The differential pressure acts on valve piston 12 in such a way that it acts against a stop position 32 by a control device 30 to reach, in accordance with the representation of FIG. 1, a fully open port position. In that fully open port position, an enlarged opening cross-section from utility port A to tank port T (see FIG. 3) is reached, compared to the stop position 32 (see FIG. 1).

For this purpose, the control device 30 includes a control duct 34, extending in the axial direction in the valve housing 10. Control duct 34 guides the respective differential pressure to a piston ring surface 36 of the otherwise pressure-equalized valve piston 12. Starting from the stop position 32, valve piston 12 can move to the fully open port position (see FIG. 3) under the influence of this differential pressure.

The pressure-effective piston ring surface 36 results from the difference in diameter $d_1$-$d_2$ (see FIG. 2) of the valve piston 12 in its upper stepped recess region. The control duct 34 opens into a diametrally expanded fluid chamber 38 of the valve housing 10. In every movement position of the valve piston 12, its one piston ring surface 36 is guided and results from a stepped transition of different piston diameters $d_1$/$d_2$ of the valve piston 12, which transition tapers in this way in the direction of the tank port T.

Viewed in the direction on FIGS. 1 and 2, the control duct 34, at its upper free end, opens in axial direction from the valve housing 10 out of its free end face where it is sealed by a closure plug 40. At the lower end at a transverse guide, the control duct 34 opens into the connection point A' at which the respective pressure between utility port A and tank port T is permanently present via the valve or control block (not shown). The pressure at point A' here corresponds to the pressure at utility port A. If the control duct 34 is closed at its upper end by the closure plug 40, it at least leaves a connection between the control duct 34 and the fluid chamber 38. To be able to seal the fluid chamber 38 against the actuating magnet 14 as well as against the pressure supply port P, the valve piston, on its outer circumference, has duct-shaped fluid seals of conventional design as well as a pressure centering groove 42.

The stop position 32 is essentially formed by a disc-shaped stop element 46, pressurized by an energy accumulator in the form of a compression spring 44. The stop element 46 is supported for this purpose on the fixed parts of the actuating magnet 14 in the form of the pole core 24. To receive the compression spring 44, the pole core 24 has a cylindrical chamber-shaped recess 48, which tapers down in diameter towards the free end of the actuating plunger 22 to form a stop shoulder 50, against which the disc 46 can abut the front end.

As shown in the figures, the valve piston 12 with its tapered or reduced diameter end 52 penetrates a cylindrical central recess of the disc-shaped stop element 46. In the region of its free end 52, valve piston 12 has a diameter widening in the manner of a catch 54. As shown in FIGS. 1 and 2, catch 54 overlaps the disc 46 from above, while abutting the same. By operating the actuator device 14, the stop element 46 is moved against the action of the energy accumulator in the form of the compression spring 44 out of the stop position 32 to a maximum possible effective position in which the fluid-carrying connection between the supply port P and the utility port A is established and the connection between utility port A and tank port T is completely blocked (not shown). In this valve position, the clutch, which is connected to the utility port A, can then be supplied with a fluid of predeterminable pressure in a predeterminable amount from the pressure supply port P. As described above, the clutch plates can then be gradually brought into contact, while overcoming clutch spring forces, for the purpose of transmitting torque through friction.

In order to establish complete pressure equalization both within the actuating magnet 14 and for the valve piston 12, both the valve piston 12 and the rod-shaped actuating element 22 in the form of the actuating plunger are provided with a continuous pressure-equalizing duct 56. At its one free end, duct 56 opens in the direction of the tank port T. At its other free end, duct 56 comes into abutment with parts of the movable magnet armature 16. As further shown in the individual figures, the pressure equalization duct 56 opens via a transverse bore 58 into the cylindrical recess 48, which recess forms the spring chamber for the compression spring 44 inside the pole core 24. The compression spring 44, with its upper free end when viewed in the direction on figures, is in direct contact with the disc-shaped stop element 46 and, with its other lower end, is in contact with a termination disc 60, which is affixed pressure-tight between one free end of the valve housing 10 and the adjacent front end of the pole core 24.

When assuming the stop position 32, the valve piston 12 has a further reduction in diameter 62 with an axial length such that at least the supply port P can be open and the utility port A can be blocked by the valve piston 12. When moving the valve piston 12 under the influence of the actuator device 14 in the direction of the tank port T, i.e. downward in viewing direction on the figures, the connection between supply port P and utility port A is increasingly established, and the connection of the supply port A to tank port T is blocked.

To disengage the clutch 100, it must be relieved with fluid connection to the tank port T. The actuating magnet 14 must be turned off first to disengage the clutch. The spring force of the compression spring 44 here pushes the valve piston 12 into a position which allows the flow from utility port A to tank port T. The disc 46 moves against the pole core 24, assuming the stop position 32. The respective valve-relief position of utility port A to tank port T without overtravel is shown in FIGS. 1 and 2.

Figure 3:
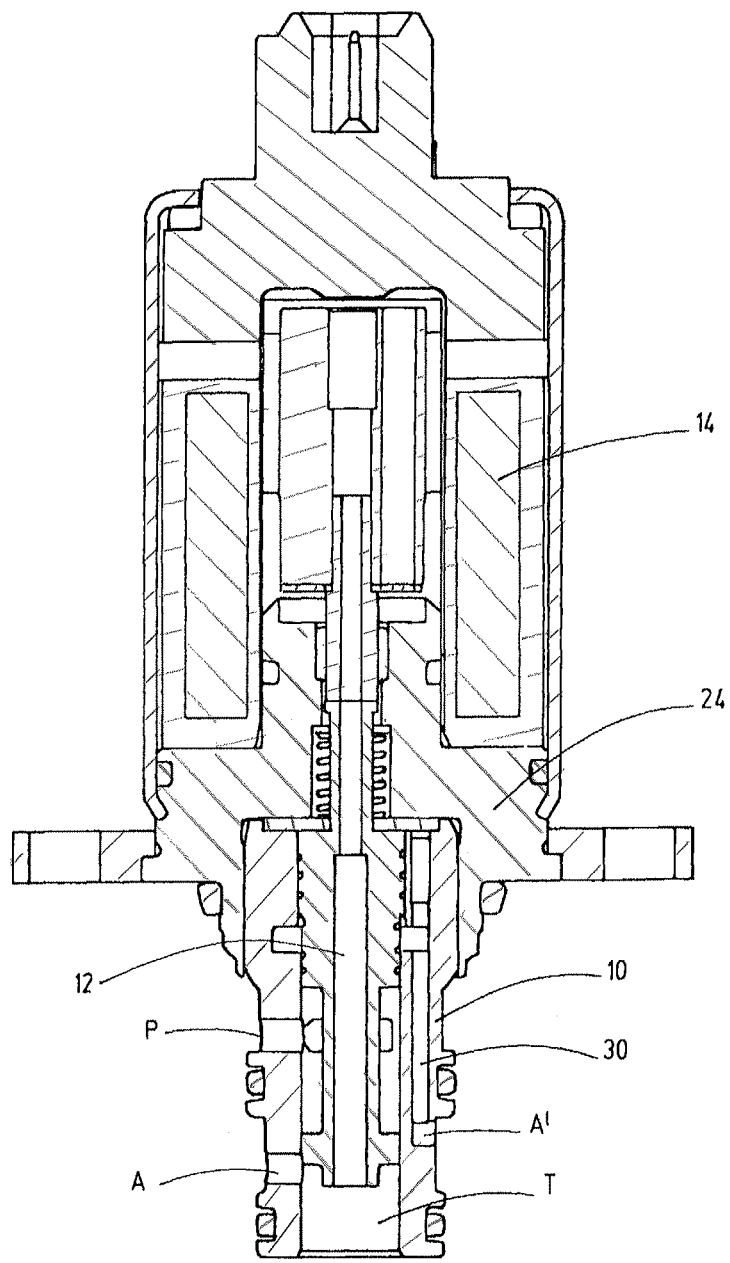
FIG. 3 is a side view in section of the valve of FIG. 1, wherein the valve is shown in the overtravel position with an enlarged opening cross-section from utility port A to tank port T.

However, starting from this stop position 32, the valve piston 12 can now continue to move upwards, according to the representations according to FIGS. 3 and 4. The catch 54 is removed from the upper face of the disc 46, thereby allowing for a larger opening cross-section between the utility port A and the tank port T. FIGS. 3 and 4 show the valve in the respective overtravel position. This overtravel of the valve piston 12 takes place without the support of the spring force of the compression spring 44 by taking advantage of the differential pressure at the connection point A' of the control duct 34 that inevitably arises during the flow through the valve from utility port A to the tank port T. This differential pressure at the connection point A' acts on the annular surface 36 of the piston 12 and, without the spring force, moves piston 12 further upward in the viewing direction in FIGS. 3 and 4.

When the clutch is completely emptied of fluid by the clutch springs again bringing the individual clutch discs to a distance from each other, the differential pressure, and hence the force effect on the valve piston 12, is eliminated. The valve piston 12 is thus in an indifferent state and, when switching on the actuating magnet 14 again, a minimal force is now sufficient to return the valve piston 12 to the point of contact with the disc 46, whereby the catch 54 again abuts the disc 46. If this point of contact is reached with the compression spring 44, as shown in FIGS. 1 and 2, the actuating magnet or electromagnet 14 is in its linear region, so that the PI characteristic line can be run through cleanly without a start-up jump. As shown in particular in FIG. 4, the fluid chamber 38 is conically tapered towards the top, so that a conical transition region 64 is formed between fluid chamber 38, significantly enlarged in diameter, with respect to the diameter $d_1$ of the valve piston 12 within its valve housing 10.

Overall, the valve construction according to the invention thus achieves the use of an inexpensive actuating magnet with a low linear stroke range, thus achieving high magnetic force without limiting the full valve stroke, which is so important for the low-loss flow.

While one embodiment has been chosen to illustrate the invention, it will be understood by those skilled in the art that various changes and modifications can be made therein without departing from the scope of the invention as defined in the claims.

The invention claimed is:

1. A valve, comprising:
   a valve housing having a pressure supply port, a utility port and a tank port;
   an actuator being coupled to said valve housing and having an actuating magnet with a pole core;
   a valve piston longitudinally displaceable and guided in said valve housing by said actuator between a first position providing a first fluid-carrying connection between said pressure supply port and said utility port and a second position providing a second fluid-carrying connection between said utility port and said tank port; and
   a differential pressure being created by fluid flowing through said second fluid-carrying connection between said utility port and said tank port and acting on said valve piston via a control duct such that said valve piston moves relative to and acts against a disc-shaped stop element, from which said second fluid-carrying connection is inhibited to move to a fully open port position in which an opening cross-section of said second fluid-carrying connection from said utility port to said tank port compared to a stop position is enlarged, said stop element being pressurized by an energy accumulator located about an end of said valve piston adjacent said actuator, said stop element being supported on said pole core of said actuating magnet and being disengagable from said valve piston to permit relative movement of said stop element and said valve piston in said valve housing.

2. A valve according to claim 1 wherein
said valve is a proportional pressure regulating valve.

3. A valve according to claim 1 wherein
said control duct carries said differential pressure to a piston ring surface on said valve piston moving said valve piston from the stop position to the fully open port position under influence of said differential pressure, said valve piston otherwise being pressure-equalized.

4. A valve according to claim 3 wherein
said control duct opens into a diametrically expanded fluid chamber in said valve housing, said piston ring surface being guided in said diametrically expanded fluid chamber, said piston ring surface resulting from a stepped transition of different piston diameters of said valve piston tapering in a direction of said tank port.

5. A valve according to claim 4 wherein
said control duct is closed at one end-side outlet from said valve housing by a closure plug in said end-side outlet, said closure plug keeping an inlet of said control duct into said diametrically expanded fluid chamber free, another end of said control duct opening into a connection point receiving said differential pressure between said utility port and said tank port.

6. A valve according to claim 3 wherein
said control duct is in said valve housing.

7. A valve according to claim 1 wherein
said energy accumulator comprises a compression spring.

8. A valve according to claim 7 wherein
said stop element comprises a disc with a central recess, in the stop position said stop element having a front end supported on said pole core, said compression spring having a first free end supported on said stop element and a second free end supported on a termination disc fixed between said valve housing and said pole core.

9. A valve according to claim 1 wherein
said valve piston comprises a first free end penetrating said stop element and having a catch moving said stop element upon actuation of said actuator against biasing of said energy accumulator from the stop position to a maximum possible effective position in which said first fluid-carrying connection between said supply port and said utility port is established and in which said second fluid-carrying connection between said utility port and said tank port is blocked.

10. A valve according to claim 1 wherein
said actuating magnet comprises a push-action actuating magnet with a rod-shaped actuating element; and
both said valve piston and said actuating element have a continuous pressure-equalizing duct in said valve piston and said actuating element, said pressure equalizing duct opening on one side into said tank port regardless of a movement position of said valve piston.

11. A valve according to claim 1 wherein
said valve piston comprises a reduced diameter portion with an axial length such that said supply port is opened and said utility port is blocked by said valve piston in the stop position; and
when said valve piston moves under influence of said actuator in a direction of said tank port, said first fluid-carrying connection between said supply port and said utility port is increasingly established.

12. A valve according to claim 1 wherein
said stop element is a separate part from said accumulator and separates said energy accumulator from said pole core of said actuating magnet.

13. A method of operating a clutch having two clutch discs establishing a frictional connection with each other in a coupled state of the clutch discs against biasing of a clutch energy accumulator, the method comprising the steps of:
providing a valve including a valve housing having a pressure supply port, a utility port connected to the clutch discs and a tank port, including an actuator coupled to the valve housing, and including a valve piston longitudinally displaceable and guided in the valve housing by the actuator between a first position providing a first fluid-carrying connection between the pressure supply port and the utility port and a second position providing a second fluid-carrying connection between the utility port and the port;
supplying pressure to the clutch discs from the utility port in the first position of the valve piston to frictionally engage the clutch discs when the actuator is activated;
connecting the utility port to the tank port to push operating fluid from the utility port to the tank port when the actuator is deactivated under an influence of the clutch energy accumulator to uncouple the clutch discs; and
creating a differential pressure by fluid flowing through the second fluid-carrying connection between the utility port and the tank port and acting on the valve piston via a control duct such that the valve piston moves relative to and acts against a disc-shaped stop element biased by an accumulator against a fixed part of the actuator or the valve housing with the accumulator being about an end of the valve piston adjacent the actuator, in which the second fluid-carrying connection is inhibited to move to a fully open port position in which an opening cross-section of the second fluid-carrying from the utility port to the tank port is enlarged compared to a stop position by further movement of the valve piston from the stop element in a direction of the actuator.

14. The method according to claim 13 wherein
after complete decoupling of the clutch discs, with the valve piston being in an indifferent state, activating the clutch by switching on the actuator again to provide a minimum magnetic force in the actuator sufficient to move the valve piston back in contact with the stop element.

15. A valve, comprising:
a valve housing having a pressure supply port, a utility port and a tank port;
an actuator being coupled to said valve housing said actuator including an actuating magnet with a pole core;
a valve piston longitudinally displaceable and guided in said valve housing by said actuator between a first position providing a first fluid-carrying connection between said pressure supply port and said utility port and a second position providing a second fluid-carrying connection between said utility port and said tank port; and a differential pressure being created by fluid flowing through said second fluid-carrying connection between said utility port and said tank port and acting on said valve piston via a control duct such that said valve piston acts against a stop disc, from which said second fluid-carrying connection is inhibited to move to a fully open port position in which an opening cross-section of said second fluid-carrying connection from said utility port to said tank port compared to the stop is enlarged, said stop disc being pressurized by a compression spring, said stop disc being supported on a fixed part of at least one of said valve housing or said actuator, said stop disc having a central recess, said stop disc in a stop position having a front end supported on said pole core, said compression spring having a first free end supported on said stop disc and a second free end supported on a termination disc fixed between said valve housing and said pole core.

16. A valve according to claim 15 wherein
said valve piston comprises a first free end penetrating said stop disc and having a catch moving said stop disc upon actuation of said actuator against biasing of said compression spring accumulator from the stop position to a maximum possible effective position in which said first fluid-carrying connection between said supply port and said utility port is established and in which said second fluid-carrying connection between said utility port and said tank port is blocked.

17. A valve according to claim 15 wherein
said actuating magnet comprises a push-action actuating magnet with a rod-shaped actuating element; and
both said valve piston and said actuating element have a continuous pressure-equalizing duct therein, said pressure equalizing duct opening on one side into said tank port regardless of a movement position of said valve piston.

18. A valve according to claim 15 wherein
said valve piston comprises a reduced diameter portion with an axial length such that said supply port is opened and said utility port is blocked by said valve piston in the stop position; and
when said valve piston moves under influence of said actuator in a direction of said tank port, said first fluid-carrying connection between said supply port and said utility port is increasingly established.

19. A valve, comprising:
a valve housing having a pressure supply port, a utility port and a tank port;
an actuator coupled to said valve housing;
a valve piston longitudinally displaceable and guided in said valve housing by said actuator between a first position providing a first fluid-carrying connection between said pressure supply port and said utility port and a second position providing a second fluid-carrying connection between said utility port and said tank port; and
a differential pressure being created by fluid flowing through said second fluid-carrying connection between said utility port and said tank port and acting on said valve piston via a control duct such that said valve piston acts against a stop element, from which said second fluid-carrying connection is inhibited to move to a fully open port position in which an opening cross-section of said second fluid-carrying connection from said utility port to said tank port compared to a stop position is enlarged, said stop element being pressurized by an energy accumulator, said stop element being supported on a fixed part of at least one of said valve housing or said actuator, said valve piston including a first free end penetrating said stop element and having a catch moving said stop element upon actuation of said actuator against biasing of said energy accumulator from the stop position to a maximum possible effective position in which said first fluid-carrying connection between said supply port and said utility port is established and in which said second fluid-carrying connection between said utility port and said tank port is blocked.

20. A valve according to claim 19 wherein
said actuator comprises a push-action actuating magnet with a rod-shaped actuating element; and
both said valve piston and said actuating element have a continuous pressure-equalizing duct in said valve piston and said actuating element, said pressure equalizing duct opening on one side into said tank port regardless of a movement position of said valve piston.

21. A valve according to claim 19 wherein
said valve piston comprises a reduced diameter portion with an axial length such that said supply port is opened and said utility port is blocked by said valve piston in the stop position; and
when said valve piston moves under influence of said actuator in a direction of said tank port, said first fluid-carrying connection between said supply port and said utility port is increasingly established.

22. A valve, comprising:
a valve housing having a pressure supply port, a utility port and a tank port;
an actuator coupled to said valve housing and having a push-action actuating magnet with a rod-shaped actuating element;
a valve piston longitudinally displaceable and guided in said valve housing by said actuator between a first position providing a first fluid-carrying connection between said pressure supply port and said utility port and a second position providing a second fluid-carrying connection between said utility port and said tank port, both said valve piston and said actuating element having a continuous pressure-equalizing duct in said valve piston and said actuating element, said pressure equalizing duct opening on one side into said tank port regardless of a movement position of said valve piston; and
a differential pressure being created by fluid flowing through said second fluid-carrying connection between said utility port and said tank port and acting on said valve piston via a control duct such that said valve piston acts against a stop located adjacent said actuator relative to said valve piston and located between said actuator and said valve piston, from which said second fluid-carrying connection is inhibited to move to a fully open port position in which an opening cross-section of said second fluid-carrying connection from said utility port to said tank port compared to a stop position is enlarged.

23. A valve according to claim 22 wherein
said valve piston comprises a reduced diameter portion with an axial length such that said supply port is opened and said utility port is blocked by said valve piston in the stop position; and when said valve piston moves under influence of said actuator in a direction of said tank port, said first fluid-carrying connection between said supply port and said utility port is increasingly established.

24. A valve, comprising:
a valve housing having a pressure supply port, a utility port and a tank port;
an actuator coupled to said valve housing;
a valve piston longitudinally displaceable and guided in said valve housing by said actuator between a first position providing a first fluid-carrying connection between said pressure supply port and said utility port and a second position providing a second fluid-carrying connection between said utility port and said tank port; and
a differential pressure being created by fluid flowing through said second fluid-carrying connection between said utility port and said tank port and acting on said valve piston via a control duct such that said valve piston acts against a stop located adjacent said actuator relative to said valve piston and located between said actuator and said valve piston, from which said second fluid-carrying connection is inhibited to move to a fully open port position in which an opening cross-section of said second fluid-carrying connection from said utility port to said tank port compared to a stop position is enlarged, said valve piston having a reduced diameter portion with an axial length such that said supply port is opened and said utility port is blocked by said valve piston in the stop position, said first fluid-carrying connection between said supply port and said utility port being increasingly established when said valve piston moves under influence of said actuator in a direction of said tank port.

* * * * *